ABSTRACT

(12) United States Patent
Huang et al.

(10) Patent No.: US 12,302,357 B2
(45) Date of Patent: May 13, 2025

(54) CONFIGURED GRANT BASED PHYSICAL UPLINK SHARED CHANNEL TRANSMISSION WITH ASSOCIATED SCHEDULING REQUEST

(71) Applicant: QUALCOMM Incorporated, San Diego, CA (US)

(72) Inventors: Yi Huang, San Diego, CA (US); Wei Yang, San Diego, CA (US); Tingfang Ji, San Diego, CA (US); Krishna Kiran Mukkavilli, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/599,484

(22) Filed: Mar. 8, 2024

(65) Prior Publication Data

US 2024/0215045 A1    Jun. 27, 2024

Related U.S. Application Data

(62) Division of application No. 17/305,924, filed on Jul. 16, 2021, now Pat. No. 11,950,251.

(60) Provisional application No. 62/705,950, filed on Jul. 23, 2020.

(51) Int. Cl.
*H04W 72/23* (2023.01)
*H04L 5/00* (2006.01)
*H04W 72/0453* (2023.01)

(52) U.S. Cl.
CPC .......... *H04W 72/23* (2023.01); *H04L 5/0053* (2013.01); *H04W 72/0453* (2013.01)

(58) Field of Classification Search
CPC ............. H04W 72/1268; H04W 72/21; H04W 72/0446; H04W 72/0453
See application file for complete search history.

(56) References Cited

U.S. PATENT DOCUMENTS

| | | | |
|---|---|---|---|
| 10,903,944 B2 * | 1/2021 | Yi ......................... | H04W 72/23 |
| 2008/0165733 A1 * | 7/2008 | Xiao .................. | H04W 72/542 |
| | | | 455/509 |
| 2018/0368169 A1 | 12/2018 | Jung et al. | |
| 2018/0368176 A1 * | 12/2018 | Sun ........................ | H04L 5/0055 |
| 2020/0205088 A1 * | 6/2020 | Yang ..................... | H04W 72/12 |
| 2021/0058948 A1 * | 2/2021 | Zhao ..................... | H04L 1/0073 |
| 2021/0274488 A1 | 9/2021 | Yamamoto et al. | |
| 2021/0329688 A1 | 10/2021 | Salim et al. | |
| 2022/0030619 A1 | 1/2022 | Huang | |

* cited by examiner

*Primary Examiner* — Kevin C. Harper
(74) *Attorney, Agent, or Firm* — Harrity & Harrity, LLP

(57) ABSTRACT

Various aspects of the present disclosure generally relate to wireless communication. In some aspects, a user equipment (UE) may transmit a physical uplink shared channel communication using a resource associated with a configured grant. The UE may transmit, in connection with transmitting the physical uplink shared channel communication, a scheduling request. A base station (BS) may monitor for the physical uplink shared channel communication and the scheduling request. The BS may selectively communicate with the UE to schedule a retransmission of the physical uplink shared channel communication based at least in part on a result of the monitoring. Numerous other aspects are provided.

20 Claims, 8 Drawing Sheets

CONFIGURED GRANT BASED PHYSICAL UPLINK SHARED CHANNEL TRANSMISSION WITH ASSOCIATED SCHEDULING REQUEST

CROSS-REFERENCE TO RELATED APPLICATIONS

This Patent Application is a divisional of U.S. patent application Ser. No. 17/305,924, filed on Jul. 16, 2021, entitled "CONFIGURED GRANT BASED PHYSICAL UPLINK SHARED CHANNEL TRANSMISSION WITH ASSOCIATED SCHEDULING REQUEST," which claims priority to U.S. Provisional Patent Application No. 62/705,950, filed on Jul. 23, 2020, entitled "CONFIGURED GRANT BASED PHYSICAL UPLINK SHARED CHANNEL TRANSMISSION WITH ASSOCIATED SCHEDULING REQUEST," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for configured grant based physical uplink shared channel transmission with associated scheduling request.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "Uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: transmitting a physical uplink shared channel communication using a resource associated with a configured grant; and transmitting, in connection with transmitting the physical uplink shared channel communication, a scheduling request.

In some aspects, a method of wireless communication performed by a base station (BS) includes: monitoring for a physical uplink shared channel communication using a resource associated with a configured grant; monitoring for a scheduling request transmitted in connection with the physical uplink shared channel communication; and selectively communicating with a UE to schedule a retransmission of the physical uplink shared channel communication based at least in part on a result of monitoring for the physical uplink shared channel communication and monitoring for the scheduling request.

In some aspects, a UE for wireless communication includes: a memory, and one or more processors coupled to the memory, the memory and the one or more processors configured to: transmit a physical uplink shared channel communication using a resource associated with a configured grant; and transmit, in connection with transmitting the physical uplink shared channel communication, a scheduling request.

In some aspects, a BS for wireless communication includes: a memory, and one or more processors coupled to the memory, the memory and the one or more processors configured to: monitor for a physical uplink shared channel communication using a resource associated with a configured grant; monitor for a scheduling request transmitted in connection with the physical uplink shared channel communication; and selectively communicate with a UE to schedule a retransmission of the physical uplink shared channel communication based at least in part on a result of monitoring for the physical uplink shared channel communication and monitoring for the scheduling request.

In some aspects, a non-transitory computer-readable medium storing a set of instructions for wireless communication includes: one or more instructions that, when executed by one or more processors of a UE, cause the UE to: transmit a physical uplink shared channel communication using a resource associated with a configured grant; and transmit, in connection with transmitting the physical uplink shared channel communication, a scheduling request.

In some aspects, a non-transitory computer-readable medium storing a set of instructions for wireless communication includes: one or more instructions that, when executed by one or more processors of a BS, cause the BS to: monitor for a physical uplink shared channel communication using a resource associated with a configured grant; monitor for a scheduling request transmitted in connection with the physical uplink shared channel communication; and selectively communicate with a UE to schedule a retransmission of the physical uplink shared channel communication based at least in part on a result of monitoring for the physical uplink shared channel communication and monitoring for the scheduling request.

In some aspects, an apparatus for wireless communication includes: means for transmitting a physical uplink shared channel communication using a resource associated with a configured grant; and means for transmitting, in connection with transmitting the physical uplink shared channel communication, a scheduling request.

In some aspects, an apparatus for wireless communication includes: means for monitoring for a physical uplink shared channel communication using a resource associated with a configured grant; means for monitoring for a scheduling request transmitted in connection with the physical uplink shared channel communication; and means for selectively communicating with a UE to schedule a retransmission of the physical uplink shared channel communication based at least in part on a result of monitoring for the physical uplink shared channel communication and monitoring for the scheduling request.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
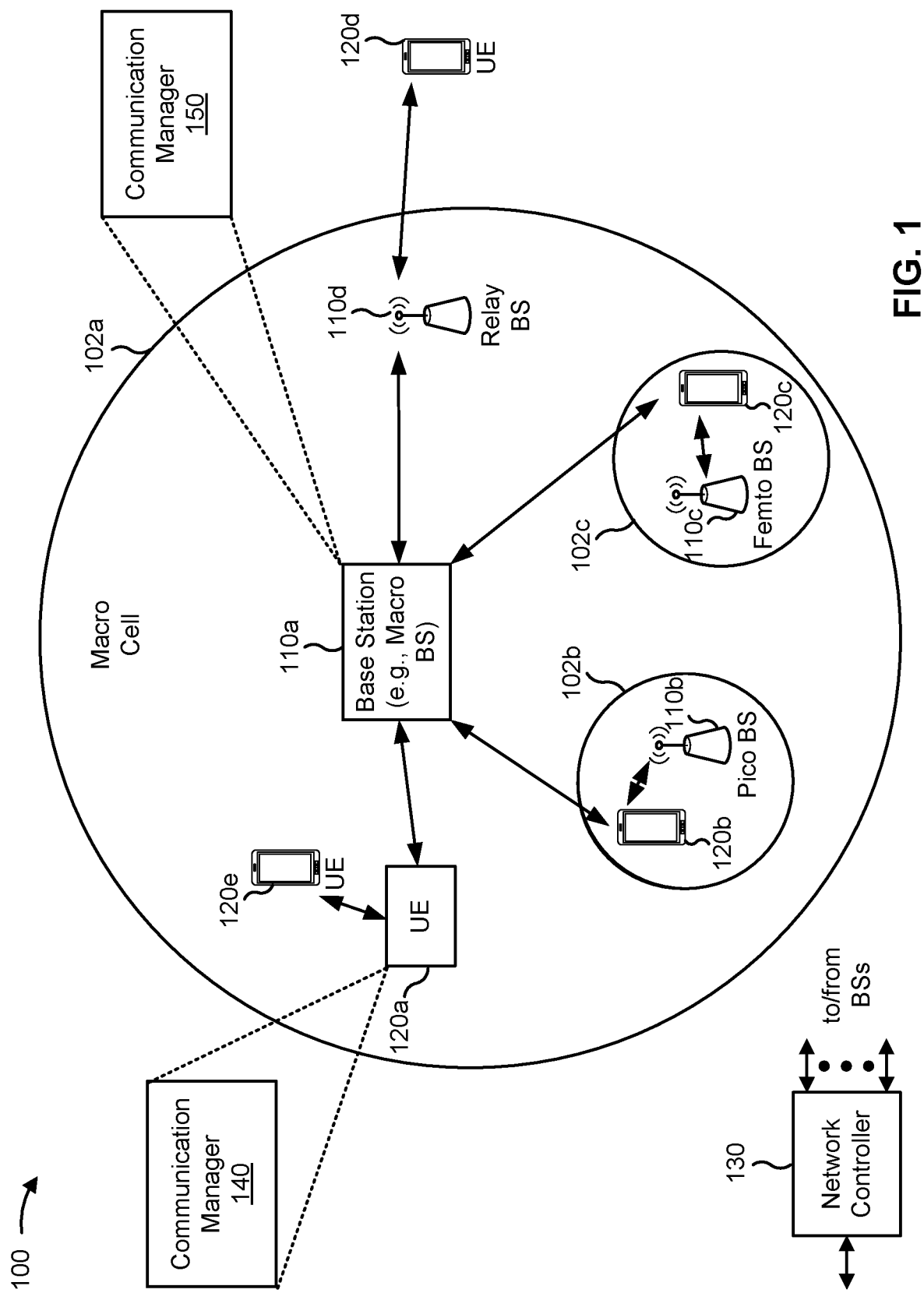
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of BSs 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an "access terminal", a "terminal", a "mobile station", a "subscriber unit", or a "station", among other examples. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a "radio technology", an "air interface", or the like. A frequency may also be referred to as a "carrier", a "frequency channel", or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, vehicle-to-pedestrian (V2P) protocol, or a vehicle-to-infrastructure (V2I) protocol), and/or a mesh network. In this case, the UE 120 may perform scheduling operations, resource selection operations, and/or other operations described elsewhere herein as being performed by the BS 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may transmit a physical uplink shared channel communication using a resource associated with a configured grant; and transmit, in connection with transmitting the physical uplink shared channel communication, a scheduling request. Additionally, or alternatively, the communication manager 140 may perform one or more other operations described herein.

In some aspects, the BS 110 may include a communication manager 150. As described in more detail elsewhere herein, the communication manager 150 may monitor for a physical uplink shared channel communication using a resource associated with a configured grant; monitor for a scheduling request transmitted in connection with the physical uplink shared channel communication; and selectively communicate with a UE to schedule a retransmission of the physical uplink shared channel communication based at least in part on a result of monitoring for the physical uplink shared channel communication and monitoring for the scheduling request. Additionally, or alternatively, the communication manager 150 may perform one or more other operations described herein.

As indicated above, FIG. 1 is provided as an example. Other examples may differ from what is described with regard to FIG. 1.

Figure 2:
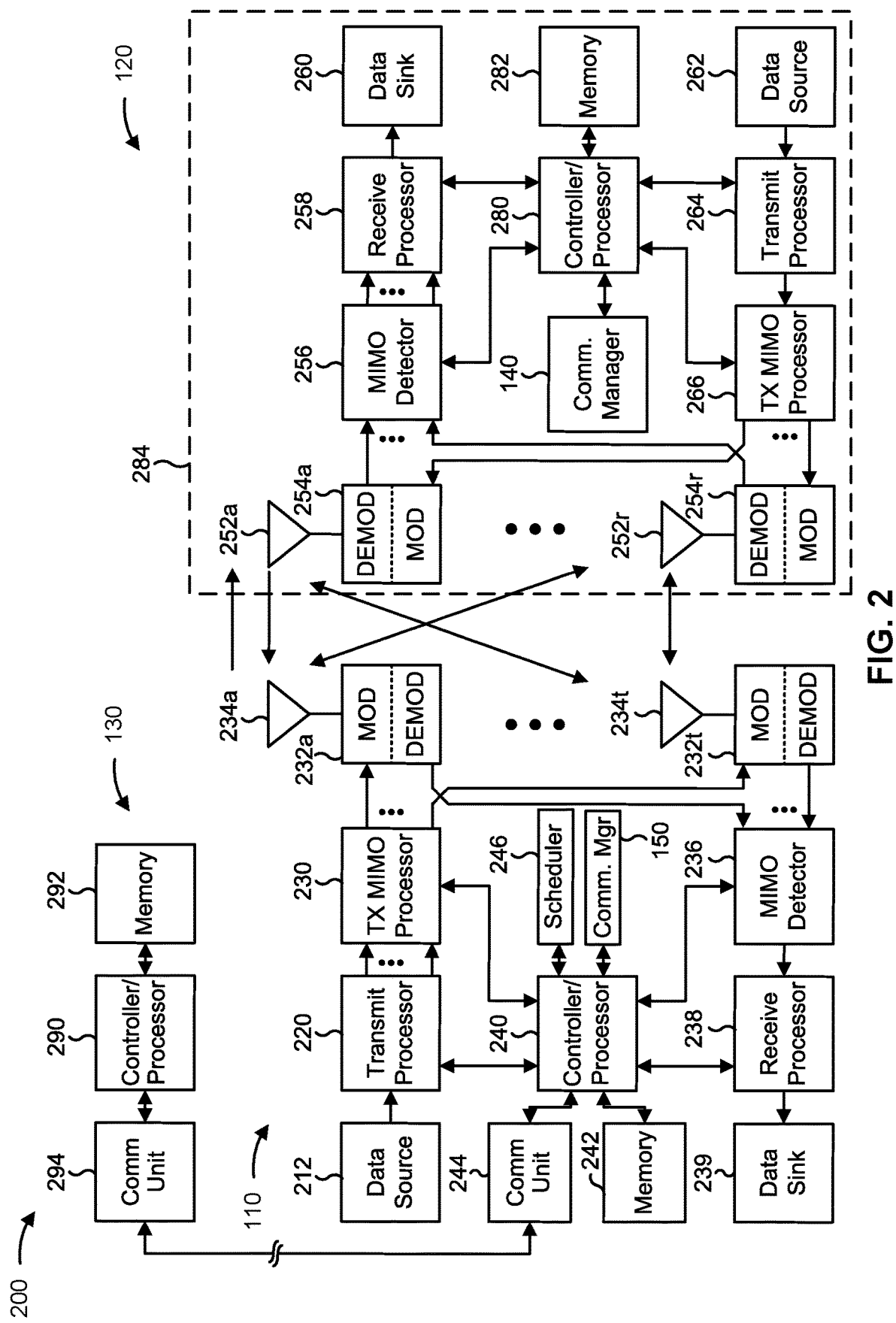
FIG. 2 is a diagram illustrating an example of a base station in communication with a UE in a wireless network, in accordance with the present disclosure.

FIG. 2 is a diagram illustrating an example 200 of a BS 110 in communication with a UE 120 in a wireless network 100, in accordance with the present disclosure. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with BS 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to BS 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. BS 110 may include a scheduler 246 to schedule UEs 120 for downlink and/or uplink communications. In some aspects, a modulator and a demodulator (e.g., MOD/DEMOD 232) of the BS 110 may be included in a modem of the BS 110. In some aspects, the BS 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of BS 110, controller/processor 280 of UE 120, and/or any other component(s) of FIG. 2 may perform one or more techniques associated with configured grant based physical uplink shared channel transmission with associated scheduling request, as described in more detail elsewhere herein. For example, controller/processor 240 of BS 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for BS 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the BS 110 and/or the UE 120, may cause the one or more processors, the UE 120, and/or the BS 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for transmitting a physical uplink shared channel communication using a resource associated with a configured grant; and/or means for transmitting, in connection with transmitting the physical uplink shared channel communication, a scheduling request. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the BS includes means for monitoring for a physical uplink shared channel communication using a resource associated with a configured grant; means for monitoring for a scheduling request transmitted in connection with the physical uplink shared channel communication; and/or means for selectively communicating with a UE to schedule a retransmission of the physical uplink shared channel communication based at least in part on a result of monitoring for the physical uplink shared channel communication and monitoring for the scheduling request. The means for the BS to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
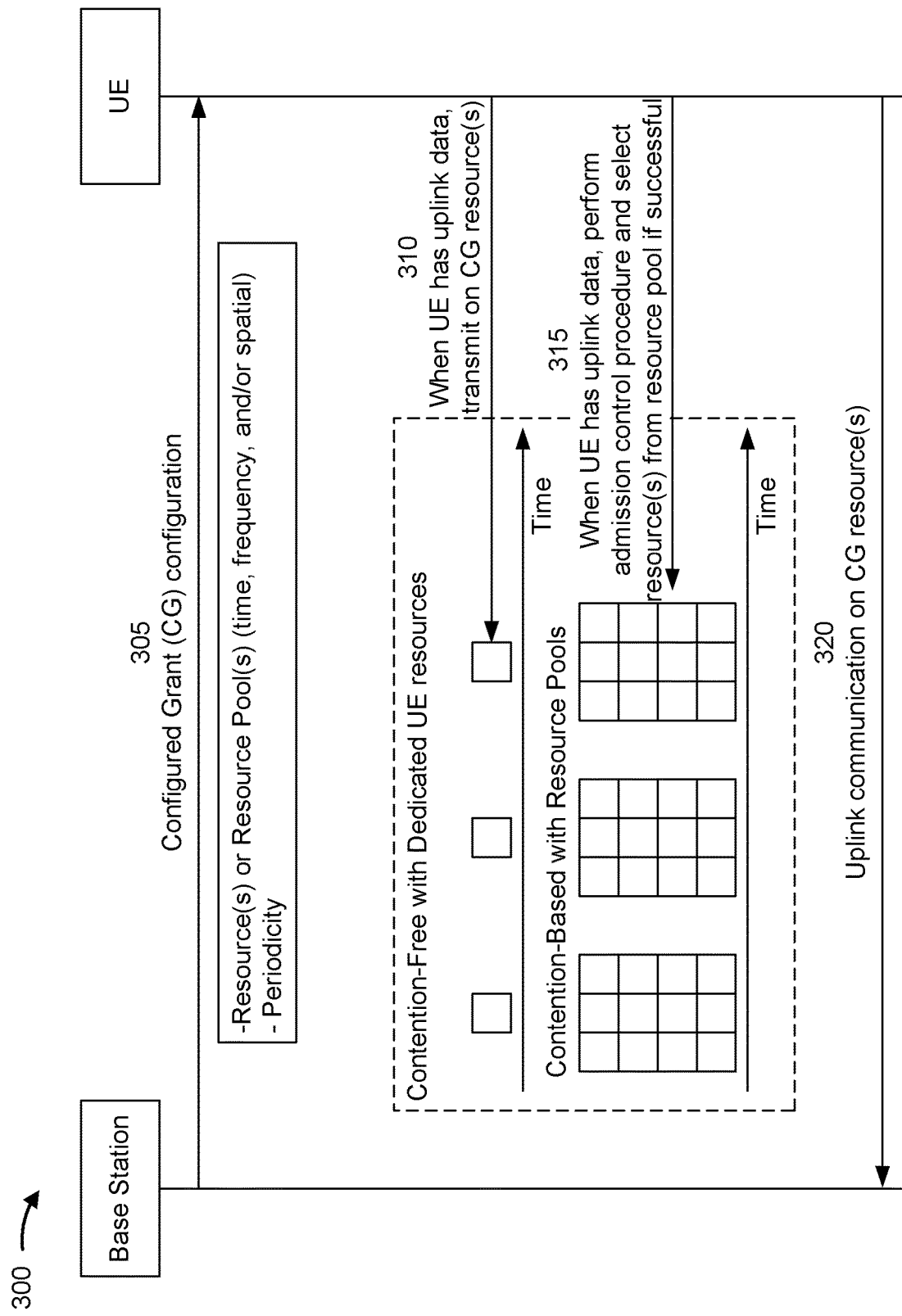
FIG. 3 is a diagram illustrating an example of configured grant communication, in accordance with the present disclosure.

FIG. 3 is a diagram illustrating an example 300 of configured grant (CG) communication, in accordance with the present disclosure. As shown, example 300 includes a base station and a UE.

As shown in FIG. 3, and by reference number 305, the base station may transmit a CG configuration to the UE. For example, the base station may transmit configuration information (e.g., in a radio resource configuration (RRC) message, in a downlink control information message, and/or the like) that identifies the CG. In some aspects, the configuration information identifying the CG may indicate a resource allocation (e.g., in a time domain, frequency domain, spatial domain, code domain, and/or the like), a periodicity associated with the resource allocation, and/or the like. The CG may identify a resource or set of resources available to the UE for transmission of an uplink communication (e.g., data, control information, and/or the like). For example, the CG configuration may identify a resource allocation for a physical uplink shared channel (PUSCH). In some aspects, the CG configuration may identify a resource pool or multiple resource pools that may be available to the UE for an uplink transmission.

In some aspects, the CG configuration may configure contention-free CG communication with resources dedicated for the UE to transmit uplink communications. In this case, the CG configuration may indicate a resource allocation (e.g., in a time domain, frequency domain, spatial domain, code domain, and/or the like) dedicated for the UE to use to transmit uplink communications. In some aspects, the CG configuration may configure the resource allocation for the UE to occur periodically, such that the resource allocation corresponds to periodically occurring transmission time occasions. As shown in FIG. 3, and by reference number 310, when the UE has uplink data to transmit, the UE transmits the uplink data in the CG resources identified by the CG configuration. For example, the UE transmits the uplink data in one of the CG uplink occasions identified in the CG configuration using the configured resource allocation.

A CG configuration with regular periodic CG uplink occasions with a dedicated resource allocation for the UE may be convenient for a UE with periodic uplink traffic (e.g., with trivial jitter). The CG configuration may configure the periodicity associated with the resource allocation to associate CG uplink occasions with periodic nominal arrival times at which traffic to be transmitted to the base station is expected to arrive at (or be ready to be transmitted by) the UE. However, the actual arrival times at which the traffic arrives (or is ready to be transmitted) by the UE may be different than the nominal arrival times, and this difference in times is known as jitter. In some aspects, traffic jittering may be handled by configuring multiple CGs around the nominal arrival times. In some aspects, multiple opportunities for the UE to transmit the uplink communication may be defined within a CG uplink occasion. The UE may be configured with multiple CG uplinks to allow the UE to repeatedly transmit the CG uplink communications and increase the likelihood that the base station receives the communications. NR CG uplink may depend on dynamic grant retransmission. In some aspects, to suppress a quantity of dynamic grants, the CG can be configured with blind re-transmissions via multiple repetitions per occasion.

In some cases, CG configurations with dedicated resources allocated per UE may be inefficient. For example, CG configurations with dedicated UE resources for a large number of UEs may result in consumption of an excessive amount of PUSCH resources. In this case, a considerable portion of the PUSCH resources may be inefficiently utilized, which reduces system capacity. For example, when multiple CG configurations for a UE are used for de-jittering, only a subset of CG resources may be effectively utilized. In another example, when multiple transmission opportunities are defined per CG uplink occasion, only one opportunity may be effectively utilized. In yet another example, when a blind repetition scheme is used for re-transmissions, a packet may have been already decoded after the first one or more repetitions (early decoding) such that a remainder of the repetitions are unnecessary. Unlike a downlink case, this type of inefficient consumption of system resources cannot be addressed by scheduling, as the base station does not know exactly when traffic will arrive at the UEs.

In some aspects, statistical multiplexing schemes may be used to allocate CG uplink resource access among multiple UEs. Statistical multiplexing of CG uplink communications from multiple UEs may be useful in cases in which there are a high number of UEs associated with somewhat random traffic arrivals at the base station, cases in which a traffic arrival density for traffic arriving at the UEs is time varying, and/or the like. For example, statistical multiplexing of CG uplink communications from multiple UEs may be useful for a network deployment, such as an industrial wireless sensor network, with a large capacity of UEs. In such cases, the uplink traffic associated with at least a group of UEs may be delay insensitive.

As shown in FIG. 3, the CG configuration may configure contention-based CG communication with resource pools that are available for multiple UEs to use to transmit uplink communications. The contention-based CG configuration uses statistical multiplexing to share the resource pools among multiple UEs. A resource pool includes multiple resources (e.g., in a time domain, frequency domain, spatial domain, code domain, and/or the like) that can be allocated for uplink transmission for one or more UEs. For example, an x-axis of an illustrated resource pool may indicate transmission times and a y-axis of the illustrated resource pool may indicate resources (e.g., frequency domain, spatial domain, code domain, and/or the like) that can be allocated at each transmission time. In some aspects, the same resource pools may be configured for multiple UEs.

Statistical multiplexing schemes may involve spreading control and overloading control. For example, spreading relates to distributing traffic (as interference to others) into a resource pool. In a specific example, direct spreading CDMA may be utilized in legacy 3G systems. NR systems which rely on an OFDMA network may utilize organized randomized resource selection, in which the base station can identify sources that contribute to collisions in a resource pool and/or local overloading of a resource pool.

Overloading control relates to controlling a level of multiplexing within a stable region. For example, overly aggressive multiplexing may result in an unusable resource pool. Rise over thermal (RoT) based control (in addition to power control) may be utilized in legacy 3G systems. In 3GPP, a central scheduler may be used to assign grants to respective UEs. In 3GPP2, a hybrid approach may be used in which an access network sends a reverse link activity bit to guide autonomous rate selection at respective UEs. Channel busy ratio (CBR) based control may be utilized in NR sidelink. For example, each sidelink UE may autonomously measure CBR and regulate its channel use based at least in part on the measured CBR.

As further shown in FIG. 3, and by reference number 315, for the contention-based CG configuration, when the UE has uplink data to be transmitted, the UE performs an admission control procedure and selects one or more resources from the resource pool if the admission control procedure is successful. In some aspects, the admission control procedure may include the UE selecting a random number (e.g., between 0 and 1, or some other range), comparing the random number and a threshold, and determining whether the random number satisfies the threshold. If the random number satisfies the threshold, then the admission is successful and the UE selects a resource from the resource pool to transmit the uplink communication.

In some aspects, the base station may control the probability of the UE accessing the resource pool by setting and/or adjusting the threshold. For example, the base station may dynamically adjust the threshold to permit more or fewer UEs to access the resource pool in order to prevent resource collisions. Additionally, or alternatively, the base station may assign different thresholds to be used by different UEs.

Based at least in part on the UE determining that the random number satisfies the threshold, the UE may select a resource from the resource pool to transmit the uplink communication. The UE may select the resource from the resource pool using randomized and/or pseudo-randomized resource selection. For example, the UE may use a hashing function based at least in part on a UE identifier, time, and/or resource pool index to select the resource from the resource pool.

As further shown in FIG. 3, and by reference number 320, the UE transmits the uplink communication to the base station on the CG resource. For example, the UE may transmit the uplink communication as a PUSCH communication using a resource allocation identified by the CG.

As indicated above, FIG. 3 is provided as an example. Other examples may differ from what is described with respect to FIG. 3.

As described above, a BS may transmit configuration information that configures a grant for a physical uplink shared channel (PUSCH) transmission. For example, the BS may transmit radio resource control (RRC) signaling to enable a UE to transmit a configured grant PUSCH communication. The configured grant may be associated with repeating resources (e.g., with a particular periodicity), and the UE may use a subset of the repeating resources for transmission. In type-1 configured grant transmission, the UE may receive the RRC signaling configuring a grant and may then transmit using configured grant resources autonomously. In other words, the UE may select which of the repetitions of the configured grant resources the UE is to use (e.g., based at least in part on an availability of data for uplink transmission) without further signaling from or to the BS. In contrast, in type-2 configured grant transmission, the UE may receive RRC signaling configuring the grant and may then receive dynamic signaling (e.g., a downlink control information (DCI) message) activating the configured grant. In this case, the UE may autonomously transmit using the configured grant resources after the configured grant is activated by the dynamic signaling.

Because the UE uses the configured grant autonomously (e.g., without the BS indicating or receiving an indication of which repetitions of configured grant resources the UE is to use), the BS may monitor the configured grant resources to attempt to detect a UE transmission. For example, the BS may perform an energy detection procedure to determine whether the UE is using the configured grant resources for PUSCH transmission. In this case, when the BS detects that the UE is transmitting, the BS may receive the PUSCH transmission and decode the PUSCH transmission. When the BS is unsuccessful at decoding the PUSCH transmission, the BS may communicate with the UE to schedule a retransmission. For example, the BS may transmit a DCI to schedule a retransmission of a PUSCH with the same hybrid automatic repeat request (HARQ) identifier as was used for the configured grant PUSCH transmission. If the UE does not receive a DCI scheduling a retransmission, the UE may determine that the configured grant PUSCH transmission was successfully received and decoded.

However, when the energy detection procedure fails, the BS may not be aware that the UE has attempted a configured grant PUSCH transmission. For example, when interference is greater than a threshold, signal strength is less than a threshold, and/or the like, the BS may not even detect enough energy in resources of a particular repetition of the configured grant to determine that the UE is attempting to transmit using the resources of the particular repetition of the configured grant. As a result, the BS may determine, incorrectly, that the UE has autonomously determined not to use the resources of the particular repetition of the configured grant. Similarly, the UE may determine, incorrectly, that the configured grant PUSCH transmission was successful based at least in part on not receiving a DCI scheduling a retransmission.

Some aspects described herein enable the UE to transmit a scheduling request in connection with a configured grant PUSCH transmission to reduce a likelihood that a BS fails to detect that the UE is attempting to transmit using resources of a configured grant. For example, the UE may transmit the configured grant PUSCH transmission and a scheduling request (e.g., that is time division multiplexed or frequency division multiplexed with the configured grant PUSCH transmission). In this case, the BS may monitor for both the configured grant PUSCH transmission and the scheduling request. As a result, even when an energy detection procedure fails for the configured grant PUSCH transmission, the BS may still be able to detect a presence of a scheduling request sequence, which may indicate to the BS that the UE is attempting a configured grant PUSCH transmission. As a result, the BS may schedule a retransmission of the configured grant PUSCH transmission even when the energy detection procedure fails. In this way, the BS and the UE reduce a likelihood of a dropped communication.

Figure 4:
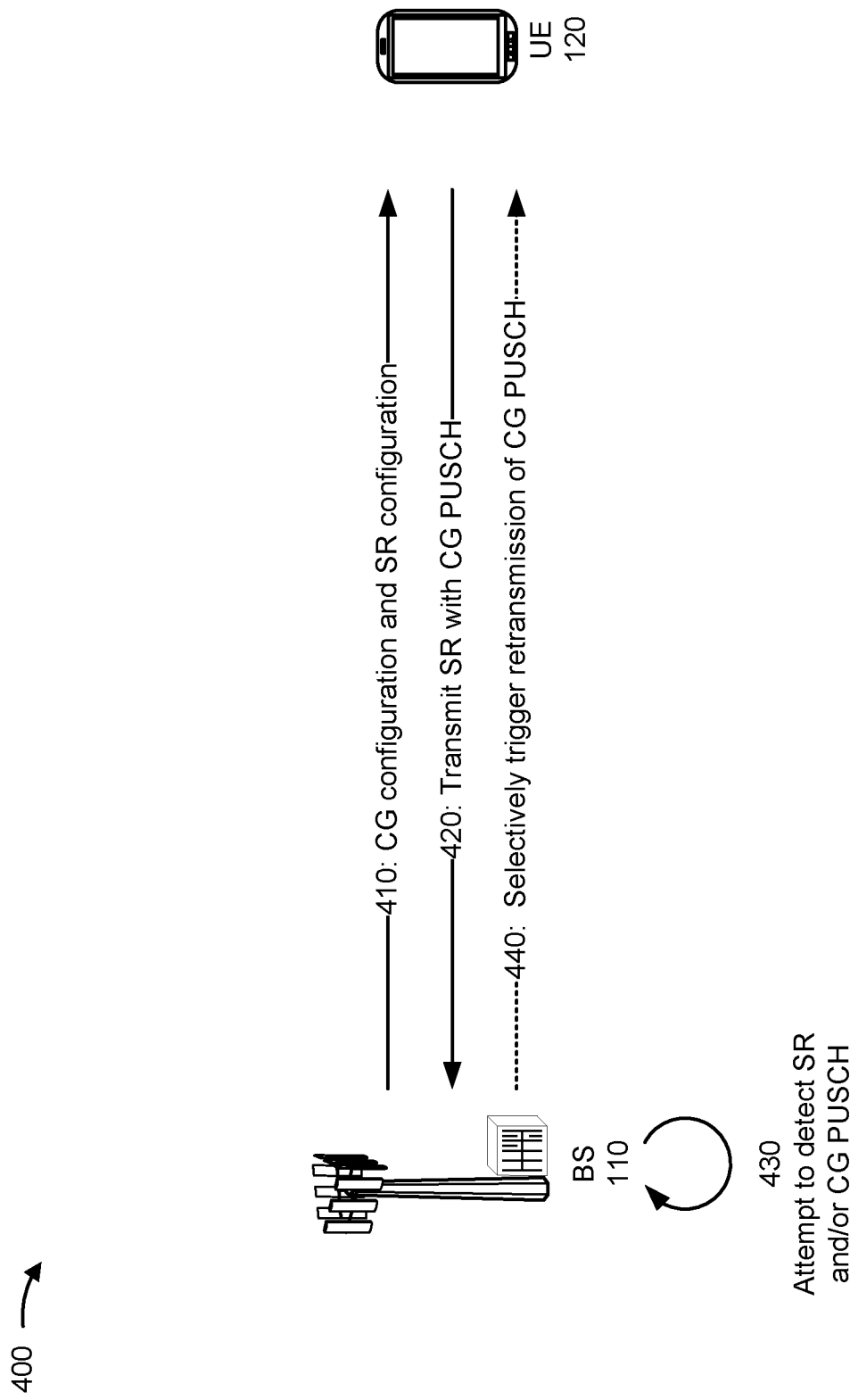
FIG. 4 is a diagram illustrating an example associated with configured grant based physical uplink shared channel transmission with associated scheduling request, in accordance with the present disclosure.

FIG. 4 is a diagram illustrating an example 400 associated with configured grant based PUSCH transmission with associated scheduling request, in accordance with the present disclosure. As shown in FIG. 4, example 400 includes communication between a BS 110 and a UE 120. In some aspects, BS 110 and UE 120 may be included in a wireless network, such as wireless network 100. BS 110 and UE 120 may communicate on a wireless access link, which may include an uplink and a downlink.

As further shown in FIG. 4, and by reference number 410, UE 120 may receive a configured grant (CG) configuration and a scheduling request (SR) configuration. For example, BS 110 may configure first resources for a configured grant PUSCH communication (e.g., type-1 configured grant PUSCH, type-2 configured grant PUSCH, and/or the like) and second resources for a scheduling request such that the first resources and the second resources have the same periodicity. In some aspects, BS 110 may configure different types of resources for the configured grant PUSCH communication and the scheduling request. For example, as described below, BS 110 may configure different resource blocks, component carriers, symbols, and/or the like for transmitting the scheduling request and for transmitting the configured grant PUSCH communication.

In some aspects, BS 110 may transmit dynamic signaling to activate transmission of the scheduling request. For example, BS 110 may transmit a DCI to activate configured grant PUSCH communication (e.g., in type-2 configured grant PUSCH) and may transmit a DCI (e.g., the same DCI or a different DCI) to indicate whether UE 120 is to also transmit a scheduling request in connection with a configured grant PUSCH communication. In this case, BS 110 may activate (or deactivate) transmission of the scheduling request based at least in part on channel conditions, a success of previous configured grant PUSCH communications, and/or the like, as described in more detail below.

As further shown in FIG. 4, and by reference number 420, UE 120 may transmit a scheduling request with a configured grant PUSCH communication. For example, UE 120 may time division multiplex the configured grant PUSCH communication and the scheduling request to transmit the configured grant PUSCH communication with the scheduling request. Additionally, or alternatively, UE 120 may frequency division multiplex the configured grant PUSCH communication and the scheduling request to transmit the configured grant PUSCH communication with the scheduling request. In some aspects, UE 120 may transmit the scheduling request and the configured grant PUSCH communication using different resources to achieve frequency diversity. For example, UE 120 may transmit the scheduling request using a first resource block or component carrier, and may transmit the configured grant PUSCH communication using a second resource block or component carrier. Additionally, or alternatively, UE 120 may transmit the scheduling request using a first set of orthogonal frequency division multiplexing (OFDM) symbols and may transmit the configured grant PUSCH communication using a second set of OFDM symbols.

As further shown in FIG. 4, and by reference number 430, BS 110 may attempt to detect the scheduling request and/or the configured grant PUSCH communication. For example, at a configured grant location (e.g., resources corresponding to a configured grant), BS 110 may perform configured grant PUSCH energy detection, as described above, and may perform scheduling request sequence detection. In this case, BS 110 may determine whether UE 120 is attempting to transmit a configured grant PUSCH communication at the configured grant location based at least in part on a result of the configured grant PUSCH energy detection and the scheduling request sequence detection. In this case, based at least in part on scheduling request sequence detection being more accurate and/or robust than configured grant PUSCH energy detection, BS 110 improves a likelihood of correctly determining whether UE 120 is attempting to transmit the configured grant PUSCH communication. Similarly, based at least in part on achieving frequency and/or time diversity with the configured grant PUSCH communication and the scheduling request, UE 120 improves a likelihood that BS 110 is able to detect at least one of the scheduling request or the configured grant PUSCH transmission.

In some aspects, BS 110 may detect the configured grant PUSCH communication (and the scheduling request). In this case, based at least in part on link quality being strong enough for BS 110 to detect the configured grant PUSCH communication, BS 110 may attempt to decode the configured grant PUSCH communication and, if unsuccessful, may transmit a DCI (or other signaling, such as a medium access control (MAC) control element (CE)) to request a retransmission. In contrast, when decoding is successful, BS 110 may transmit a DCI or MAC CE to turn off scheduling request transmission, thereby reducing a utilization of communication resources when link quality is strong enough to avoid dropped communications. In some aspects, after causing UE 120 to turn off scheduling request transmission, BS 110 and/or UE 120 may determine to turn scheduling request transmission back on. For example, UE 120 may turn scheduling request transmission back on after waking up from a discontinuous reception (DRX) sleep state, handing over from another serving cell, switching between RRC states, expiration of a timer (e.g., which BS 110 may configure as a threshold quantity of slots, a threshold time, and/or the like after scheduling request transmission is turned off), and/or the like.

In some aspects, BS 110 may detect the scheduling request but may fail to detect the configured grant PUSCH communication. In this case, based at least in part on link quality not being strong enough for BS 110 to detect the configured grant PUSCH communication (but strong enough for BS 110 to determine, from the scheduling request, that UE 120 was attempting to transmit the configured grant PUSCH communication), BS 110 may transmit a DCI to schedule a retransmission of the PUSCH communication. Additionally, or alternatively, BS 110 may transmit the DCI to cause UE 120 to switch from configured grant PUSCH transmission to dynamic grant PUSCH transmission on different resource blocks (e.g., that may be associated with improved link quality). Additionally, or alternatively, when BS 110 does not detect the scheduling request or the configured grant PUSCH communication, BS 110 may wait for UE 120 to trigger a radio link failure or random access channel procedure (e.g., after a threshold quantity of failed scheduling request attempts) to cause UE 120 to retransmit dropped data.

As further shown in FIG. 4, and by reference number 440, BS 110 may selectively trigger retransmission of the configured grant PUSCH communication.

As indicated above, FIG. 4 is provided as an example. Other examples may differ from what is described with respect to FIG. 4.

Figure 5:
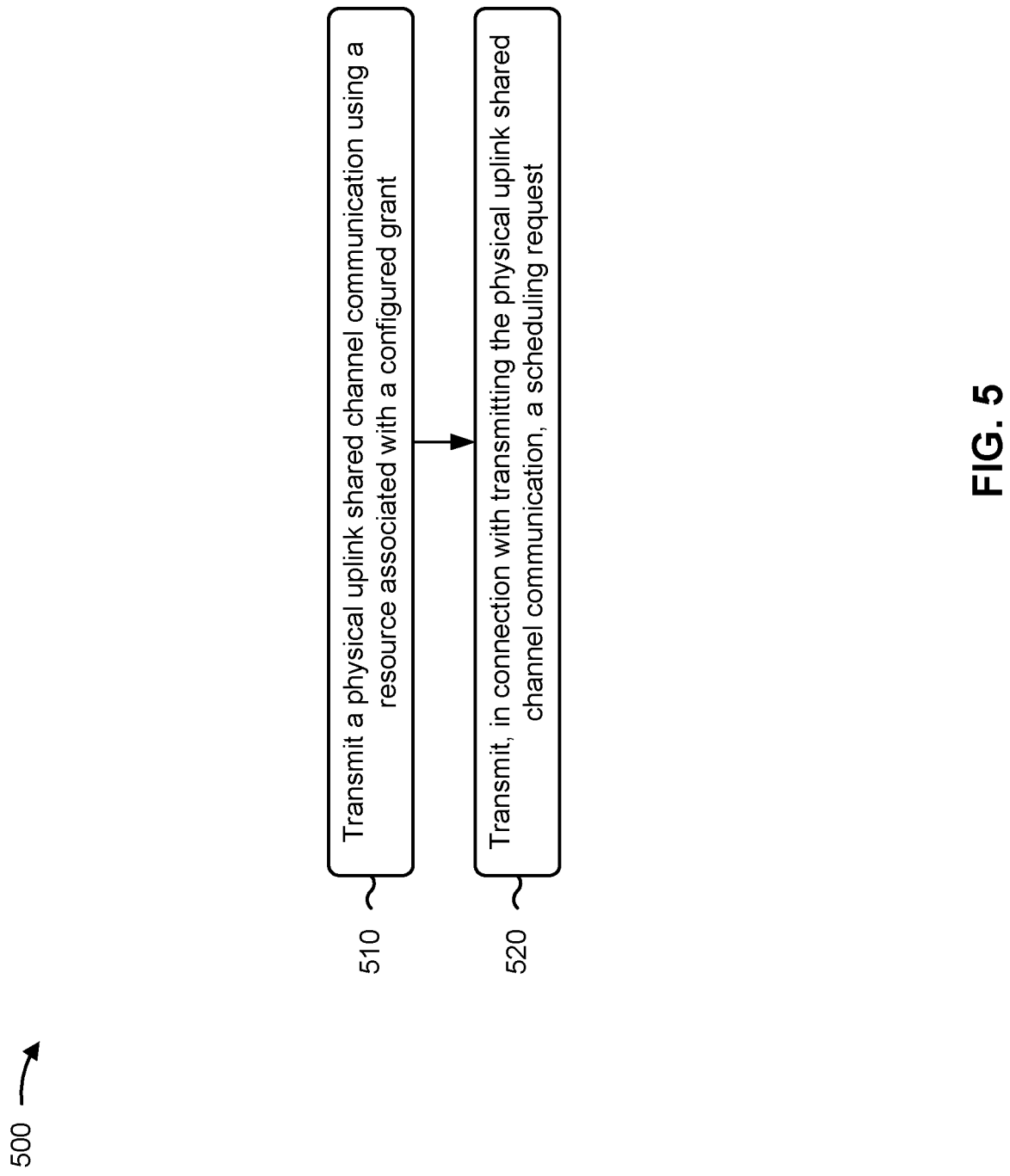
FIGS. 5-6 are diagrams illustrating example processes associated with configured grant based physical uplink shared channel transmission with associated scheduling request, in accordance with the present disclosure.

FIG. 5 is a diagram illustrating an example process 500 performed, for example, by a UE, in accordance with the present disclosure. Example process 500 is an example where the UE (e.g., UE 120) performs operations associated with configured grant based PUSCH transmission with associated scheduling request.

As shown in FIG. 5, in some aspects, process 500 may include transmitting a PUSCH communication using a resource associated with a configured grant (block 510). For example, the UE (e.g., using antenna 252, transmit processor 264, TX MIMO processor 266, modulator 254, controller/processor 280, and/or memory 282) may transmit a PUSCH communication using a resource associated with a configured grant, as described above.

As further shown in FIG. 5, in some aspects, process 500 may include transmitting, in connection with transmitting the physical uplink shared channel communication, a scheduling request (block 520). For example, the UE (e.g., using antenna 252, transmit processor 264, TX MIMO processor 266, modulator 254, controller/processor 280, and/or memory 282) may transmit, in connection with transmitting the physical uplink shared channel communication, a scheduling request, as described above.

Process 500 may include additional aspects, such as any single aspect or any combination of aspects described below and/or in connection with one or more other processes described elsewhere herein.

In a first aspect, the scheduling request is time division multiplexed with the physical uplink shared channel communication.

In a second aspect, alone or in combination with the first aspect, the scheduling request is frequency division multiplexed with the physical uplink shared channel communication.

In a third aspect, alone or in combination with one or more of the first and second aspects, process 500 includes receiving first signaling identifying the resource associated with the configured grant, and receiving second signaling, in connection with the first signaling, identifying another resource for transmitting the scheduling request.

In a fourth aspect, alone or in combination with one or more of the first through third aspects, the first signaling and the second signaling are a common signaling message.

In a fifth aspect, alone or in combination with one or more of the first through fourth aspects, the resource associated with the configured grant differs from the other resource for transmission of the scheduling request with regard to at least one of an assigned resource block, an assigned component carrier, or an assigned orthogonal frequency division multiplexing symbol.

In a sixth aspect, alone or in combination with one or more of the first through fifth aspects, process 500 includes receiving dynamic signaling to activate or deactivate transmission of scheduling requests in connection with physical uplink shared channel transmissions.

In a seventh aspect, alone or in combination with one or more of the first through sixth aspects, process 500 includes detecting a triggering event, and activating transmission of scheduling requests in connection with physical uplink shared channel transmissions based at least in part on detecting the triggering event.

In an eighth aspect, alone or in combination with one or more of the first through seventh aspects, the triggering event is at least one of a discontinuous reception mode state change, a handover, a radio resource control state change, or an expiration of a timer.

In a ninth aspect, alone or in combination with one or more of the first through eighth aspects, the scheduling request is on a first component carrier and the physical uplink shared channel communication is on a second component carrier.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
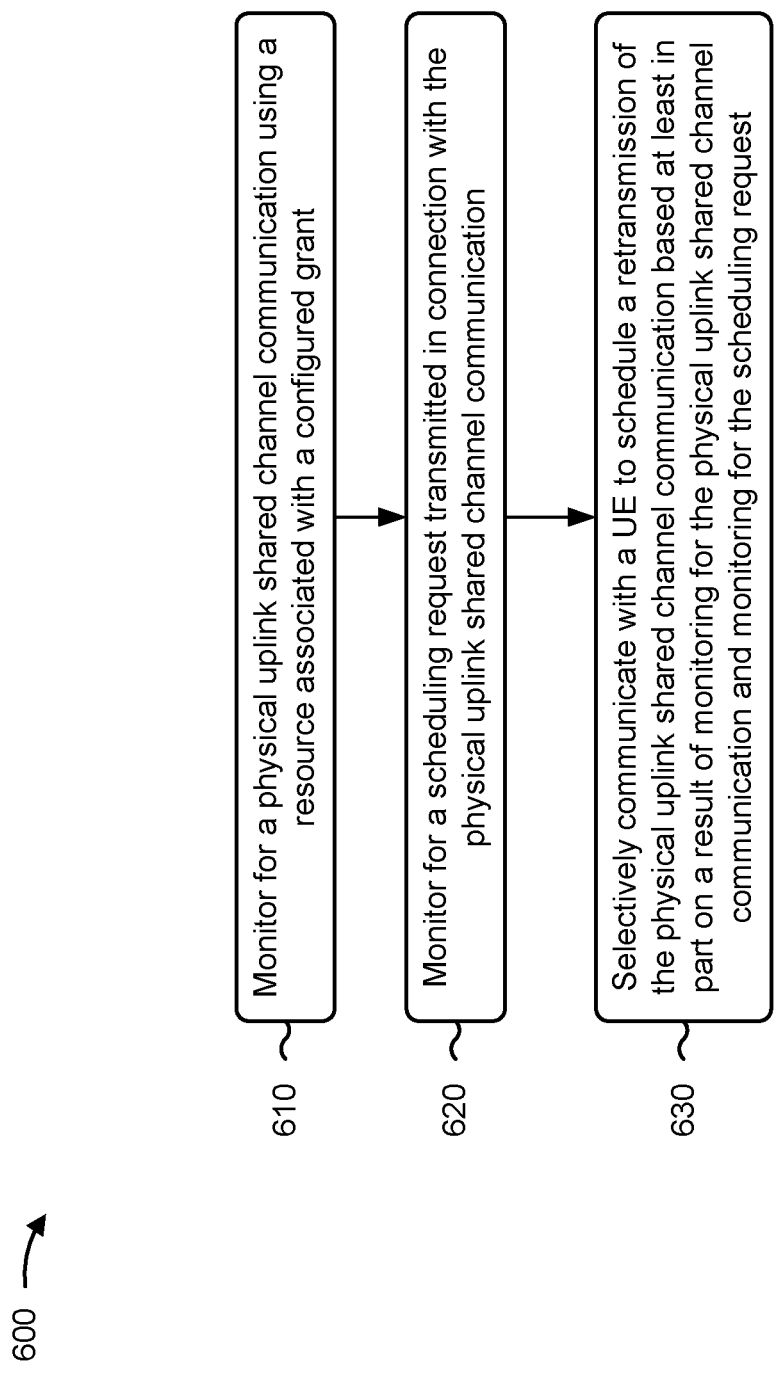

FIG. 6 is a diagram illustrating an example process 600 performed, for example, by a BS, in accordance with the present disclosure. Example process 600 is an example where the BS (e.g., BS 110) performs operations associated with configured grant based PUSCH transmission with associated SR.

As shown in FIG. 6, in some aspects, process 600 may include monitoring for a physical uplink shared channel communication using a resource associated with a configured grant (block 610). For example, the BS (e.g., using transmit processor 220, TX MIMO processor 230, modulator 232, antenna 234, demodulator 232, MIMO detector 236, receive processor 238, controller/processor 240, memory 242, and/or scheduler 246) may monitor for a physical uplink shared channel communication using a resource associated with a configured grant, as described above.

As further shown in FIG. 6, in some aspects, process 600 may include monitoring for a scheduling request transmitted in connection with the physical uplink shared channel communication (block 620). For example, the BS (e.g., using transmit processor 220, TX MIMO processor 230, modulator 232, antenna 234, demodulator 232, MIMO detector 236, receive processor 238, controller/processor 240, memory 242, and/or scheduler 246) may monitor for a scheduling request transmitted in connection with the physical uplink shared channel communication, as described above.

As further shown in FIG. 6, in some aspects, process 600 may include selectively communicating with a UE to schedule a retransmission of the physical uplink shared channel communication based at least in part on a result of monitoring for the physical uplink shared channel communication and monitoring for the scheduling request (block 630). For example, the BS (e.g., using transmit processor 220, TX MIMO processor 230, modulator 232, antenna 234, demodulator 232, MIMO detector 236, receive processor 238, controller/processor 240, memory 242, and/or scheduler 246) may selectively communicate with a UE to schedule a retransmission of the physical uplink shared channel communication based at least in part on a result of monitoring for the physical uplink shared channel communication and monitoring for the scheduling request, as described above.

Process 600 may include additional aspects, such as any single aspect or any combination of aspects described below and/or in connection with one or more other processes described elsewhere herein.

In a first aspect, the scheduling request is time division multiplexed with the physical uplink shared channel communication.

In a second aspect, alone or in combination with the first aspect, the scheduling request is frequency division multiplexed with the physical uplink shared channel communication.

In a third aspect, alone or in combination with one or more of the first and second aspects, process 600 includes transmitting first signaling identifying the resource associated with the configured grant, and transmitting second signaling, in connection with the first signaling, identifying another resource for transmission of the scheduling request.

In a fourth aspect, alone or in combination with one or more of the first through third aspects, the first signaling and the second signaling are a common signaling message.

In a fifth aspect, alone or in combination with one or more of the first through fourth aspects, the resource associated with the configured grant differs from the other resource for transmission of the scheduling request with regard to at least one of an assigned resource block, an assigned component carrier, or an assigned orthogonal frequency division multiplexing symbol.

In a sixth aspect, alone or in combination with one or more of the first through fifth aspects, process 600 includes transmitting dynamic signaling to activate or deactivate transmission of scheduling requests in connection with physical uplink shared channel transmissions.

In a seventh aspect, alone or in combination with one or more of the first through sixth aspects, monitoring for the physical uplink shared channel communication comprises performing configured grant physical uplink shared channel energy detection.

In an eighth aspect, alone or in combination with one or more of the first through seventh aspects, monitoring for the scheduling request comprises performing scheduling request sequence detection.

In a ninth aspect, alone or in combination with one or more of the first through eighth aspects, selectively communicating with the UE comprises transmitting signaling to alter a configuration of physical uplink shared channel transmission based at least in part on the result of monitoring for the physical uplink shared channel communication and monitoring for the scheduling request.

In a tenth aspect, alone or in combination with one or more of the first through ninth aspects, the scheduling request is on a first component carrier and the physical uplink shared channel communication is on a second component carrier.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
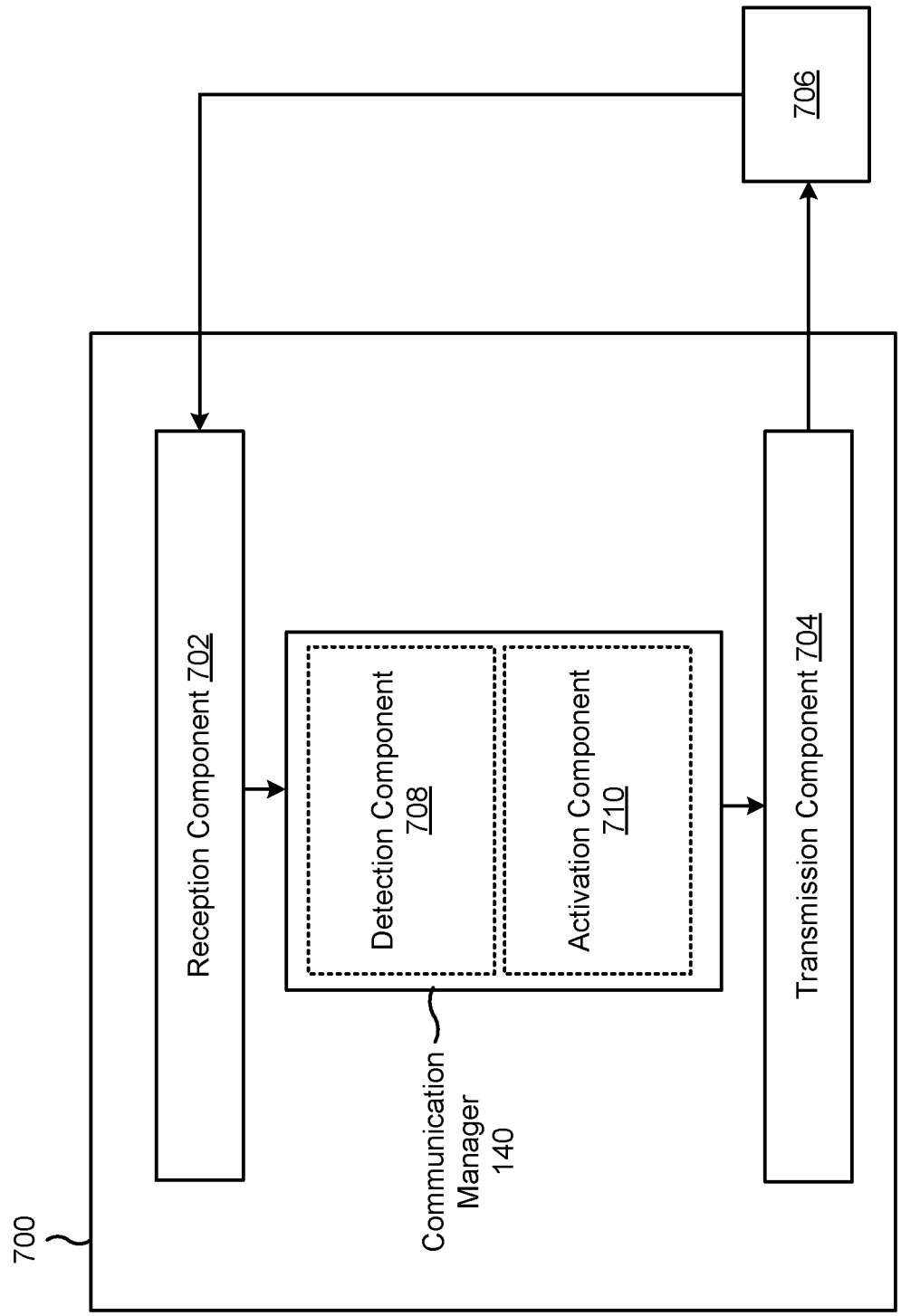
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a detection component 708 or an activation component 710, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The transmission component 704 may transmit a physical uplink shared channel communication using a resource associated with a configured grant. The transmission component 704 may transmit, in connection with transmitting the physical uplink shared channel communication, a scheduling request.

The reception component 702 may receive first signaling identifying the resource associated with the configured grant. The reception component 702 may receive second signaling, in connection with the first signaling, identifying another resource for transmitting the scheduling request. The reception component 702 may receive dynamic signaling to activate or deactivate transmission of scheduling requests in connection with physical uplink shared channel transmissions. The detection component 708 may detect a triggering event. The activation component 710 may activate transmission of scheduling requests in connection with physical uplink shared channel transmissions based at least in part on detecting the triggering event.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
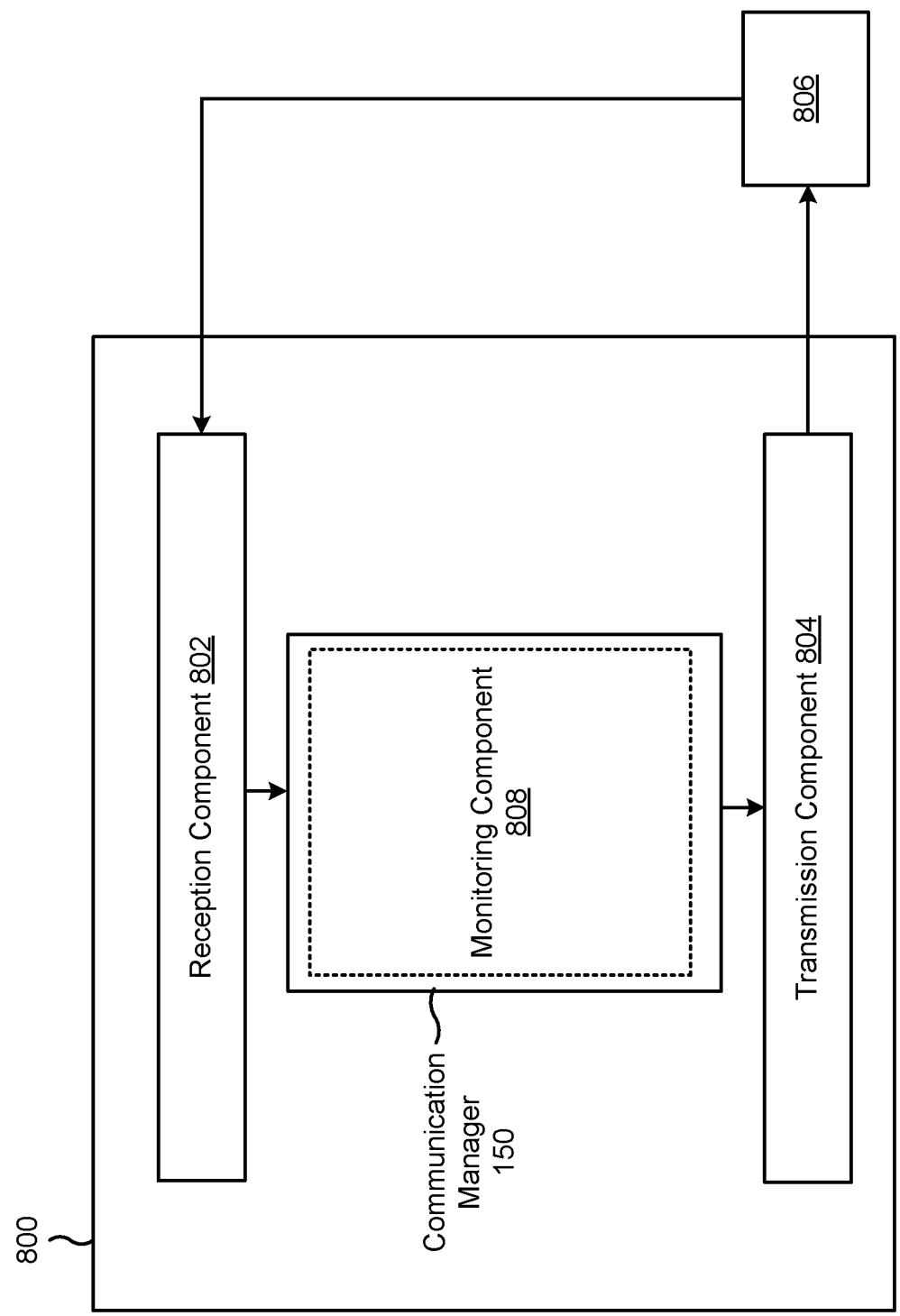

FIG. 8 is a block diagram of an example apparatus 800 for wireless communication. The apparatus 800 may be a BS, or a BS may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a monitoring component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the BS described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the BS described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806.

In some aspects, the transmission component 804 may include one or more antennas, a modulator, a transmit MIMO processor, a transmit processor, a controller/processor, a memory, or a combination thereof, of the BS described above in connection with FIG. 2. In some aspects, the transmission component 804 may be co-located with the reception component 802 in a transceiver.

The monitoring component 808 may monitor for a physical uplink shared channel communication using a resource associated with a configured grant. The monitoring component 808 may monitor for a scheduling request transmitted in connection with the physical uplink shared channel communication. The reception component 802 and/or the transmission component 804 may selectively communicate with a UE to schedule a retransmission of the physical uplink shared channel communication based at least in part on a result of monitoring for the physical uplink shared channel communication and monitoring for the scheduling request.

The transmission component 804 may transmit first signaling identifying the resource associated with the configured grant. The transmission component 804 may transmit second signaling, in connection with the first signaling, identifying another resource for transmission of the scheduling request. The transmission component 804 may transmit dynamic signaling to activate or deactivate transmission of scheduling requests in connection with physical uplink shared channel transmissions.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: transmitting a physical uplink shared channel communication using a resource associated with a configured grant; and transmitting, in connection with transmitting the physical uplink shared channel communication, a scheduling request.

Aspect 2: The method of Aspect 1, wherein the scheduling request is time division multiplexed with the physical uplink shared channel communication.

Aspect 3: The method of any of Aspects 1 to 2, wherein the scheduling request is frequency division multiplexed with the physical uplink shared channel communication.

Aspect 4: The method of Aspect 3, wherein the scheduling request is on a first component carrier and the physical uplink shared channel communication is on a second component carrier.

Aspect 5: The method of any of Aspects 1 to 4, further comprising: receiving first signaling identifying the resource associated with the configured grant; and receiving second signaling, in connection with the first signaling, identifying another resource for transmitting the scheduling request.

Aspect 6: The method of Aspect 5, wherein the first signaling and the second signaling are a common signaling message.

Aspect 7: The method of any of Aspects 5 to 6, wherein the resource associated with the configured grant differs from the other resource for transmission of the scheduling request with regard to at least one of: an assigned resource block, an assigned component carrier, or an assigned orthogonal frequency division multiplexing symbol.

Aspect 8: The method of any of Aspects 1 to 7, further comprising: receiving dynamic signaling to activate or deactivate transmission of scheduling requests in connection with physical uplink shared channel transmissions.

Aspect 9: The method of any of Aspects 1 to 8, further comprising: detecting a triggering event; and activating transmission of scheduling requests in connection with physical uplink shared channel transmissions based at least in part on detecting the triggering event.

Aspect 10: The method of Aspect 9, wherein the triggering event is at least one of: a discontinuous reception mode state change, a handover, a radio resource control state change, or an expiration of a timer.

Aspect 11: A method of wireless communication performed by a base station (BS), comprising: monitoring for a physical uplink shared channel communication using a resource associated with a configured grant; monitoring for a scheduling request transmitted in connection with the physical uplink shared channel communication; and selectively communicating with a user equipment (UE) to schedule a retransmission of the physical uplink shared channel communication based at least in part on a result of monitoring for the physical uplink shared channel communication and monitoring for the scheduling request.

Aspect 12: The method of Aspect 11, wherein the scheduling request is time division multiplexed with the physical uplink shared channel communication.

Aspect 13: The method of any of Aspects 11 to 12, wherein the scheduling request is frequency division multiplexed with the physical uplink shared channel communication.

Aspect 14: The method of Aspect 13, wherein the scheduling request is on a first component carrier and the physical uplink shared channel communication is on a second component carrier.

Aspect 15: The method of any of Aspects 11 to 14, further comprising: transmitting first signaling identifying the resource associated with the configured grant; and transmitting second signaling, in connection with the first signaling, identifying another resource for transmission of the scheduling request.

Aspect 16: The method of Aspect 15, wherein the first signaling and the second signaling are a common signaling message.

Aspect 17: The method of any of Aspects 15 to 16, wherein the resource associated with the configured grant differs from the other resource for transmission of the scheduling request with regard to at least one of: an assigned resource block, an assigned component carrier, or an assigned orthogonal frequency division multiplexing symbol.

Aspect 18: The method of any of Aspects 11 to 17, further comprising: transmitting dynamic signaling to activate or deactivate transmission of scheduling requests in connection with physical uplink shared channel transmissions.

Aspect 19: The method of any of Aspects 11 to 18, wherein monitoring for the physical uplink shared channel communication comprises performing configured grant physical uplink shared channel energy detection.

Aspect 20: The method of any of Aspects 11 to 19, wherein monitoring for the scheduling request comprises: performing scheduling request sequence detection.

Aspect 21: The method of any of Aspects 11 to 20, wherein selectively communicating with the UE comprises: transmitting signaling to alter a configuration of physical uplink shared channel transmission based at least in part on the result of monitoring for the physical uplink shared channel communication and monitoring for the scheduling request.

Aspect 22: An apparatus for wireless communication at a device, comprising a processor; memory coupled with the processor; and instructions stored in the memory and executable by the processor to cause the apparatus to perform the method of one or more Aspects of Aspects 1-10.

Aspect 23: A device for wireless communication, comprising a memory and one or more processors coupled to the memory, the memory and the one or more processors configured to perform the method of one or more Aspects of Aspects 1-10.

Aspect 24: An apparatus for wireless communication, comprising at least one means for performing the method of one or more Aspects of Aspects 1-10.

Aspect 25: A non-transitory computer-readable medium storing code for wireless communication, the code comprising instructions executable by a processor to perform the method of one or more Aspects of Aspects 1-10.

Aspect 26: A non-transitory computer-readable medium storing a set of instructions for wireless communication, the set of instructions comprising one or more instructions that, when executed by one or more processors of a device, cause the device to perform the method of one or more Aspects of Aspects 1-10.

Aspect 27: An apparatus for wireless communication at a device, comprising a processor; memory coupled with the processor; and instructions stored in the memory and executable by the processor to cause the apparatus to perform the method of one or more Aspects of Aspects 11-21.

Aspect 28: A device for wireless communication, comprising a memory and one or more processors coupled to the memory, the memory and the one or more processors configured to perform the method of one or more Aspects of Aspects 11-21.

Aspect 29: An apparatus for wireless communication, comprising at least one means for performing the method of one or more Aspects of Aspects 11-21.

Aspect 30: A non-transitory computer-readable medium storing code for wireless communication, the code comprising instructions executable by a processor to perform the method of one or more Aspects of Aspects 11-21.

Aspect 31: A non-transitory computer-readable medium storing a set of instructions for wireless communication, the set of instructions comprising one or more instructions that, when executed by one or more processors of a device, cause the device to perform the method of one or more Aspects of Aspects 11-21.

The foregoing disclosure provides illustration and description, but is not intended to be exhaustive or to limit the aspects to the precise forms disclosed. Modifications and variations may be made in light of the above disclosure or may be As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A base station (BS) for wireless communication, comprising:
   one or more memories; and
   one or more processors, coupled with the one or more memories and configured to cause the BS to:
      transmit signaling configuring a grant for a configured grant physical uplink shared channel communication and configuring a resource for the configured grant physical uplink shared channel communication;
      monitor the resource for the configured grant physical uplink shared channel communication based at least in part on configuring the grant for the configured grant physical uplink shared channel communication;
      monitor for a scheduling request transmitted in connection with the configured grant physical uplink shared channel communication; and
      selectively communicate with a user equipment (UE) to schedule a retransmission of the configured grant physical uplink shared channel communication based at least in part on a result of monitoring for the configured grant physical uplink shared channel communication and monitoring for the scheduling request.

2. The BS of claim 1, wherein the scheduling request is time division multiplexed with the configured grant physical uplink shared channel communication.

3. The BS of claim 1, wherein the scheduling request is frequency division multiplexed with the configured grant physical uplink shared channel communication.

4. The BS of claim 3, wherein the scheduling request is on a first component carrier and the configured grant physical uplink shared channel communication is on a second component carrier.

5. The BS of claim 1, wherein the signaling configuring the grant and the resource is first signaling, and wherein the one or more processors are further configured to cause the BS to:
   transmit second signaling, in connection with the first signaling, identifying another resource for transmission of the scheduling request.

6. The BS of claim 5, wherein the first signaling and the second signaling are a common signaling message.

7. The BS of claim 5, wherein the resource for the configured grant physical uplink shared channel communication differs from the other resource for transmission of the scheduling request with regard to at least one of: an assigned resource block, an assigned component carrier, or an assigned orthogonal frequency division multiplexing symbol.

8. The BS of claim 1, wherein the one or more processors are further configured to cause the BS to:
   transmit dynamic signaling to activate or deactivate transmission of scheduling requests in connection with configured grant physical uplink shared channel transmissions.

9. The BS of claim 1, wherein the one or more processors, to monitor for the configured grant physical uplink shared channel communication, are configured to perform configured grant physical uplink shared channel energy detection.

10. The BS of claim 1, wherein the one or more processors, to monitor for the scheduling request, are configured to cause the BS to:
    perform scheduling request sequence detection.

11. The BS of claim 1, wherein the one or more processors, to selectively communicate with the UE, are configured to cause the BS to:
    transmit signaling to alter a configuration of configured grant physical uplink shared channel transmissions based at least in part on the result of monitoring for the configured grant physical uplink shared channel communication and monitoring for the scheduling request.

12. A method of wireless communication performed by a base station (BS), comprising:
    transmitting signaling configuring a grant for a configured grant physical uplink shared channel communication and configuring a resource for the configured grant physical uplink shared channel communication;
    monitoring the resource for the configured grant physical uplink shared channel communication based at least in part on configuring the grant for the configured grant physical uplink shared channel communication;
    monitoring for a scheduling request transmitted in connection with the configured grant physical uplink shared channel communication; and
    selectively communicating with a user equipment (UE) to schedule a retransmission of the configured grant physical uplink shared channel communication based at least in part on a result of monitoring for the configured grant physical uplink shared channel communication and monitoring for the scheduling request.

13. The method of claim 12, wherein the scheduling request is time division multiplexed with the configured grant physical uplink shared channel communication.

14. The method of claim 12, wherein the scheduling request is frequency division multiplexed with the configured grant physical uplink shared channel communication.

15. The method of claim 14, wherein the scheduling request is on a first component carrier and the configured grant physical uplink shared channel communication is on a second component carrier.

16. The method of claim 12, wherein the signaling configuring the grant and the resource is first signaling, the method further comprising:
    transmitting second signaling, in connection with the first signaling, identifying another resource for transmission of the scheduling request.

17. A non-transitory computer-readable medium storing a set of instructions for wireless communication, the set of instructions comprising:
    one or more instructions that, when executed by one or more processors of a base station (BS), cause the BS to:

transmit signaling configuring a grant for a configured grant physical uplink shared channel communication and configuring a resource for the configured grant physical uplink shared channel communication;

monitor the resource for the configured grant physical uplink shared channel communication based at least in part on configuring the grant for the configured grant physical uplink shared channel communication;

monitor for a scheduling request transmitted in connection with the configured grant physical uplink shared channel communication; and selectively communicate with a user equipment (UE) to schedule a retransmission of the configured grant physical uplink shared channel communication based at least in part on a result of monitoring for the configured grant physical uplink shared channel communication and monitoring for the scheduling request.

18. The non-transitory computer-readable medium of claim 17, wherein the scheduling request is time division multiplexed with the configured grant physical uplink shared channel communication.

19. The non-transitory computer-readable medium of claim 17, wherein the scheduling request is frequency division multiplexed with the configured grant physical uplink shared channel communication.

20. The non-transitory computer-readable medium of claim 19, wherein the scheduling request is on a first component carrier and the configured grant physical uplink shared channel communication is on a second component carrier.

* * * * *